United States Patent
Castaneda Neto et al.

(10) Patent No.: US 12,049,818 B2
(45) Date of Patent: Jul. 30, 2024

(54) UPSCALING OF FORMATION PETROPHYSICAL CHARACTERISTICS TO A WHOLE CORE SCALE

(71) Applicant: Halliburton Energy Services, Inc., Houston, TX (US)

(72) Inventors: Rafael March Castaneda Neto, Rio de Jainero (BR); Santiago Gabriel Drexler, Rio de Jainero (BR); Gabriela Alexandra Davalos, Richmond, TX (US); Naum Moiseyevich Derzhi, Houston, TX (US); Jonas Toelke, Houston, TX (US); Milena Ferreira de Siqueira Lima, Rio de Jainero (BR)

(73) Assignee: Halliburton Ener y Services, Inc., Houston, TX (US)

( * ) Notice: Subject to any disclaimer, the term of this patent is extended or adjusted under 35 U.S.C. 154(b) by 379 days.

(21) Appl. No.: 17/648,090

(22) Filed: Jan. 14, 2022

(65) Prior Publication Data
US 2023/0228187 A1    Jul. 20, 2023

(51) Int. Cl.
  *E21B 49/00*  (2006.01)
  *E21B 49/02*  (2006.01)
  *G01V 8/00*  (2006.01)

(52) U.S. Cl.
  CPC ........... *E21B 49/003* (2013.01); *E21B 49/02* (2013.01); *G01V 8/00* (2013.01); *E21B 2200/20* (2020.05)

(58) Field of Classification Search
  None
  See application file for complete search history.

(56) References Cited

U.S. PATENT DOCUMENTS

2012/0277996 A1 * 11/2012 Hurley ............... G01V 20/00
                                                         382/109
2012/0281883 A1    11/2012 Hurley et al.
(Continued)

FOREIGN PATENT DOCUMENTS

CA      2868872 A1    10/2013
CN    107680131 A      2/2018
(Continued)

OTHER PUBLICATIONS

Jonoud, et al., "New criteria for the validity of steady-state upscaling", Transport in Porous Media; Dordrecht, vol. 71, Issue 1, published online Jun. 8, 2007, pp. 53-73.
(Continued)

*Primary Examiner* — Sean M Conner
(74) *Attorney, Agent, or Firm* — DeLizio, Peacock, Lewin & Guerra, LLP

(57) ABSTRACT

A method includes imaging, at an imaging resolution, a core of a subsurface formation to create a core image and iteratively performing the following operations until a defined feature of a rock of the subsurface formation exceeds a viewable image feature threshold: extracting a number of subsamples from the core for a first iteration and from each of the number of subsamples previously extracted for a subsequent iteration; increasing the imaging resolution; and imaging each subsample. The method includes performing the following operations for the subsamples last extracted: determining at least one formation property characteristic; determining a guiding rock property for each voxel of the core image and the number of subsample images; and determining a subsample that is a shortest distance to the voxel based on the number of guiding rock properties; and mapping, for each voxel, the at least one (Continued)

formation property characteristic that is the shortest distance.

20 Claims, 4 Drawing Sheets

(56) References Cited

U.S. PATENT DOCUMENTS

| | | | |
|---|---|---|---|
| 2013/0259190 | A1 | 10/2013 | Walls et al. |
| 2016/0245950 | A1 | 8/2016 | Ramsay |
| 2021/0238997 | A1 | 8/2021 | Wei et al. |

FOREIGN PATENT DOCUMENTS

| | | | |
|---|---|---|---|
| WO | 2012118867 | A2 | 9/2012 |
| WO | 2017095395 | A1 | 6/2017 |
| WO | 2020212721 | A1 | 10/2020 |

OTHER PUBLICATIONS

Pickup, et al., "An assessment of steady-state scale-up for small-scale geological models", Petroleum Geoscience, vol. 6, Issue 3, Sep. 1, 2000, pp. 203-210.

Rücker, et al., "Workflow for Upscaling Wettability from the Nanoscale to Core Scale", Petrophysics, vol. 61, Issue 02, SPWLA-2020-v61n2a5, Apr. 1, 2020, 14 pages.

PCT Application No. PCT/US2022/070231, International Search Report and Written Opinion, Sep. 30, 2022, 8 pages.

Botha, Pieter W. et al., "Mapping permeability in low-resolution micro-CT images: A multiscale statistical approach", Water Resources Research, vol. 52, Issue 6 May 3, 2016, 23 pages.

Khalili, A. Dehghan et al., "Formation Factor for Heterogeneous Carbonate Rocks Using Multi-scale Xray-CT images", Presented at the SPE Kuwait International Petroleum Conference and Exhibition, Kuwait City, Kuwait Dec. 10, 2012, 25 pages.

Youssef, Souhail et al., "Quantitative 3D Characterization of the Pore Space of Real Rocks: Improved μ-CT Resolution and Pore Extraction Methodology", Presented at the International Symposium of the Society of Core Analysts, Calgary Sep. 10, 2007, 13 pages.

* cited by examiner

UPSCALING OF FORMATION PETROPHYSICAL CHARACTERISTICS TO A WHOLE CORE SCALE

TECHNICAL FIELD

The disclosure generally relates to the field of hydrocarbon exploration and recovery, and, more particularly, to upscaling of formation petrophysical characteristics to a whole core scale.

BACKGROUND

Many factors may affect the development of oil and gas fields. To increase the production and profitability of hydrocarbon recovery from a reservoir within a subsurface formation, reservoir simulation models can be generated to allow reservoir engineers to plan and manage the operations. Creating full field models of reservoirs can be difficult and time consuming.

BRIEF DESCRIPTION OF THE DRAWINGS

Embodiments of the disclosure may be better understood by referencing the accompanying drawings.

DESCRIPTION OF EMBODIMENTS

Figure 1:
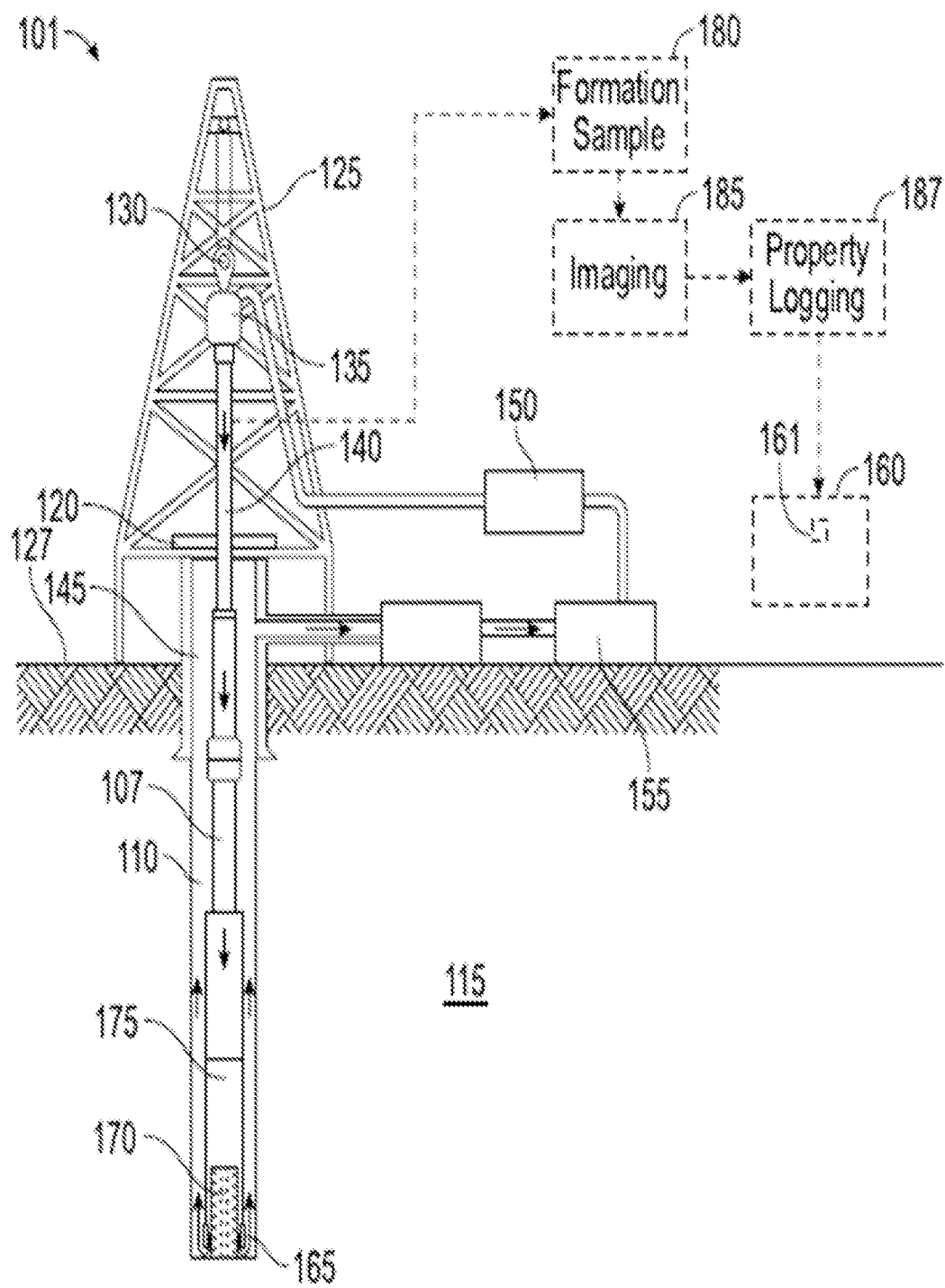
FIG. 1 depicts an example environment in which a formation sample (or core) can be extracted from a subsurface formation, according to some embodiments.

The description that follows includes example systems, methods, techniques, and program flows that embody embodiments of the disclosure. However, it is understood that this disclosure may be practiced without these specific details. For instance, this disclosure refers to create images of cores and subsamples using computed tomography (CT) in illustrative examples. In some embodiments, other types of imaging technology can be used to create these images. In other instances, well-known instruction instances, protocols, structures and techniques have not been shown in detail in order not to obfuscate the description.

Example embodiments relate to evaluation of reservoirs for hydrocarbon recovery therefrom. Some implementations can include modeling of such reservoirs that requires upscaling of the various formation property characteristics (such as relative permeability rock properties) to a whole core scale. Relative permeability is a fluid saturation-dependent curve that quantifies the permeability of each fluid phase when multiple phases are present in the pore space of a porous rock. Relative permeability can be a key input to populate large-scale dynamic reservoir simulation models that are built to evaluate fluid flow of multiple phases in subsurface formations. Also, core imaging can be used to scan multiple core sections to understand the pore-scale structure of the rocks.

In order to achieve a sufficient resolution to allow open pore evaluation, a small subsample can be extracted from the rock. Formation property characteristics can be computed or determined from these small subsamples. For example, formation property characteristics can include formation properties (such as petrophysical parameters) and curves defining such properties. For example, as part of a downhole operation (e.g., drilling, wireline, etc.), a core can be extracted from a subsurface formation by a tool positioned in a wellbore. The core can be brought to the surface of the wellbore. At the surface, one or more subsamples can be extracted from the core. In some embodiments, the subsamples can be extracted from target textures from a core at the core scale.

Additionally, one or more subsamples can then be extracted from the previously extracted one or more subsamples. Some embodiments can include scanning to capture images of the whole core and each of the subsamples. In some implementations, the images can be computed topography (CT) images: 1) a whole-core dual-energy CT (DECT) image of the core, 2) a subsample CT image of each of the subsamples. Also, in some implementations, the subsample images can be segmented into different classes (including open pores and one or more different textures identified at this resolution of the scan of the subsample images). This segmentation can then be used in selection of the subsamples to be physically extracted. The subsamples can be scanned to create subsample images. These subsample images can then be segmented into different classes (including open pores and minerals).

At the subsample scale, values of different formation property characteristics can be computed (including porosity, permeability, relative permeability, and capillary pressure). In some embodiments, these different formation properties can be computed using numerical simulations. Each subsample can be assigned an average density and an average photoelectric factor (extracted from the DECT whole-core image). The core image can include a number of voxels. These voxels can be populated with corresponding values of the different formation property characteristics based on the relative permeability and photoelectric factor values for each voxel. In some embodiments, the result can be a cartesian mesh at the whole-core scale whose voxels are populated with values of the different formation property characteristics. Some embodiments can obtain the final effective relative permeability for a core. For example, numerical simulations can be performed with different oil-water fractional flows to obtain this final relative permeability for the core. Accordingly, example embodiments can incorporate the effects of the pore structure in the two-phase large-scale relative permeability using information from a wide range of spatial scales (e.g., from micro/nano meter to meter). Thus, example embodiments can include numerical simulation of multiphase fluid flow—which can be an important factor in the exploitation of subsurface energy resources.

Thus, example embodiments can incorporate features from high-resolution micro scans (from the subsamples) to populate a lower resolution whole core image. Density and photoelectric factor from DECT can link the formation features from sub-sample to core scale. These populated core images can be used to optimize the generation of a larger grid to calculate relative permeabilities that can be input in dynamic models. Accordingly, formation property characteristics can be computed from a dataset generated in multiple scales derived from scanned images—thereby capturing viscous effects that appear at larger scales in a very heterogeneous system.

Example embodiments can include upscaling these formation property characteristics to the whole-core scanned image. This can be challenging (especially in carbonate rocks) because such upscaling can require mapping the subsample results to voxels of a low resolution tomography core image. Such embodiments can include upscaled formation property characteristics that capture the rock heterogeneity at a core scale and can be used as input to large-scale dynamic reservoir models. Thus, as further described below, example embodiments can combine imaging technology, geological knowledge, and numerical simulations at the whole-core scale to compute upscaled petrophysical properties (such as relative permeabilities).

Example embodiments can bridge the gap between pore-scale and reservoir-scale processes that govern multi-phase fluid flow in the subsurface. Therefore, example embodiments can provide data that can be used to populate reservoir models. Additionally, example embodiments can provide an improved modeling of the multi-phase flow in hydrocarbon reservoirs. This modeling can maximize asset value by allowing for optimization of injection models and improve the production forecast using better petrophysical models.

An example application for such embodiments can be the extraction and production of hydrocarbon fluids from porous rocks. Moreover, with the energy industry's commitment to decarbonization and the energy transition, numerical simulation can allow for a better understanding of the storage potential in carbon dioxide sequestration sites or heat flow in geothermal reservoirs.

Example Environment

FIG. 1 depicts an example environment in which a formation sample (or core) can be extracted from a subsurface formation, according to some embodiments. In FIG. 1, an example environment 101 includes a drill string 107 extending in a wellbore 110 of a formation 115. The drill string 107 extends from a platform 120.

As depicted in FIG. 1, along with platform 120 is a derrick 125 that supports a hoist 130 for raising and lowering a drill string 107. A swivel 135 is provided from which a Kelly 140 extends suitable for rotating and lowering the drill string 107 through the well entrance 145. A pump 150 pumps a drilling fluid in the direction shown by the arrows through the drill string 107 and then up through an annulus of the wellbore 110 and to the mud tank or pit 155.

A processor 160 having one or more processors 161 may be provided for control of the drilling and/or analyzing samples. Sample analysis may be conducted in a laboratory on site or remotely and maybe employed for processing imaging, property logging and/or rendering graphics or carrying out other processing as disclosed herein.

The drill string 107 has a hollowed drill bit 165 which has a hollow center or portion for receiving a formation sample 170. The drill string 107 may include a core chamber 175 for retaining the formation sample until it is brought to the surface. The formation sample 170 may be any suitable length for testing or extraction, including about ½ inch (1.27 cm) to about 5 inches (12.7 cm), or alternatively from about 1 inch (2.54 cm) to about 4 inches (10.16 cm), or alternatively from about 1.5 inches (3.81 cm) to about 2.5 inch (6.35 cm) in length.

The formation samples may also be longer and may be less than 1 foot, or from 1 foot to 3 to 5 feet, or alternatively from 5 to 50 feet, or alternatively from 5 to 100 feet, or as much as 500 feet long. Longer samples may be cut into smaller samples of 1 to 4 feet for analysis. The extracted formation sample 170 may be in a cylindrical shape due to the shape in which it is cut by the drill bit 165 and retained. The drill string 107 may incorporate components for logging while drilling (LWD) or measurement while drilling (MWD) which may measure various properties or carrying out imaging of the formation which may be communicated to the surface via wire, or wirelessly, such as by acoustic transmission or mud pulse telemetry. In this way, in addition to obtaining a formation sample during drilling, imaging and or log properties can be obtained.

Example Operations

Figure 2:
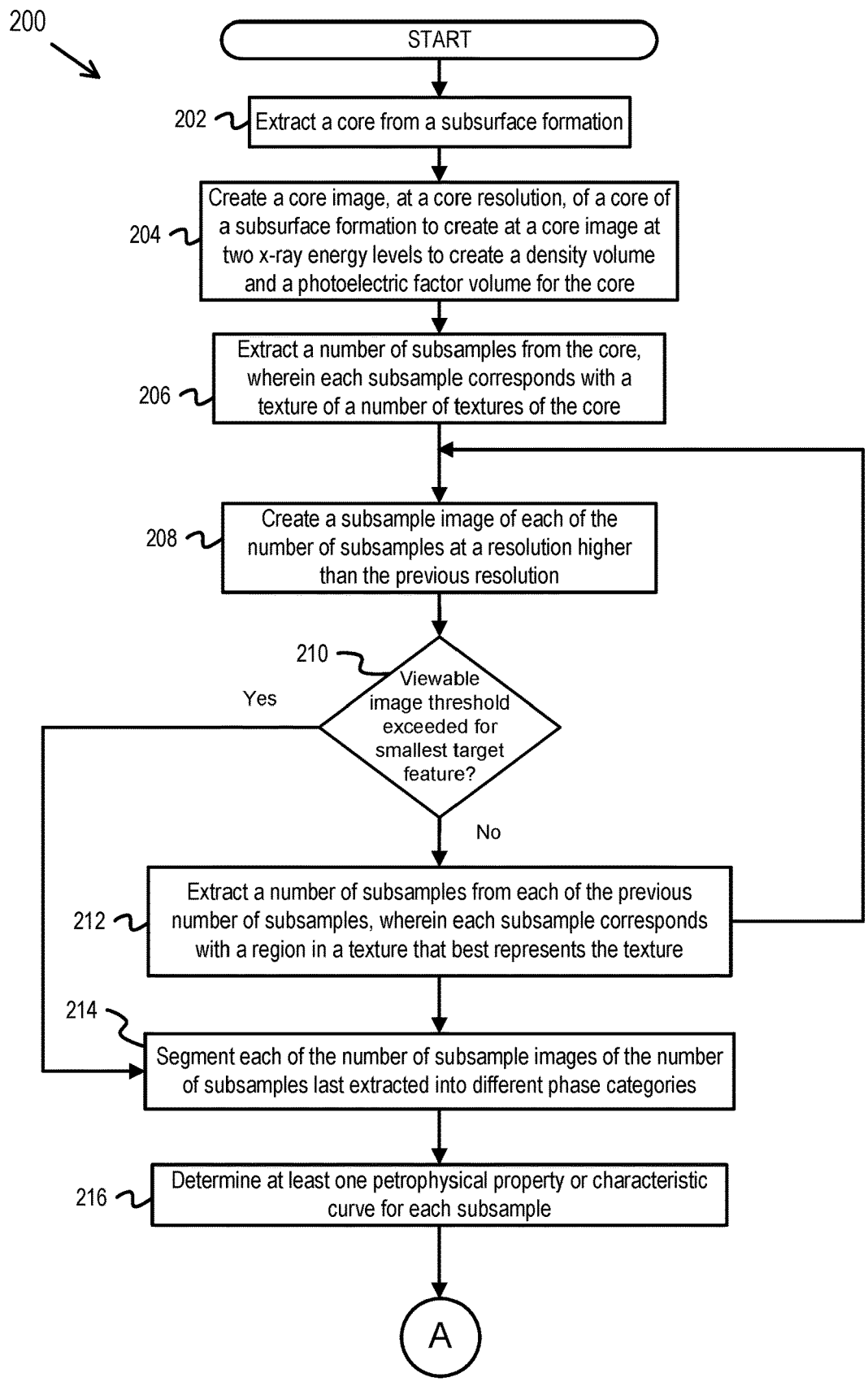
FIGS. 2-3 depict a flowchart of example operations for upscaling of formation property characteristics to a whole core scale, according to some embodiments.
Figure 3:
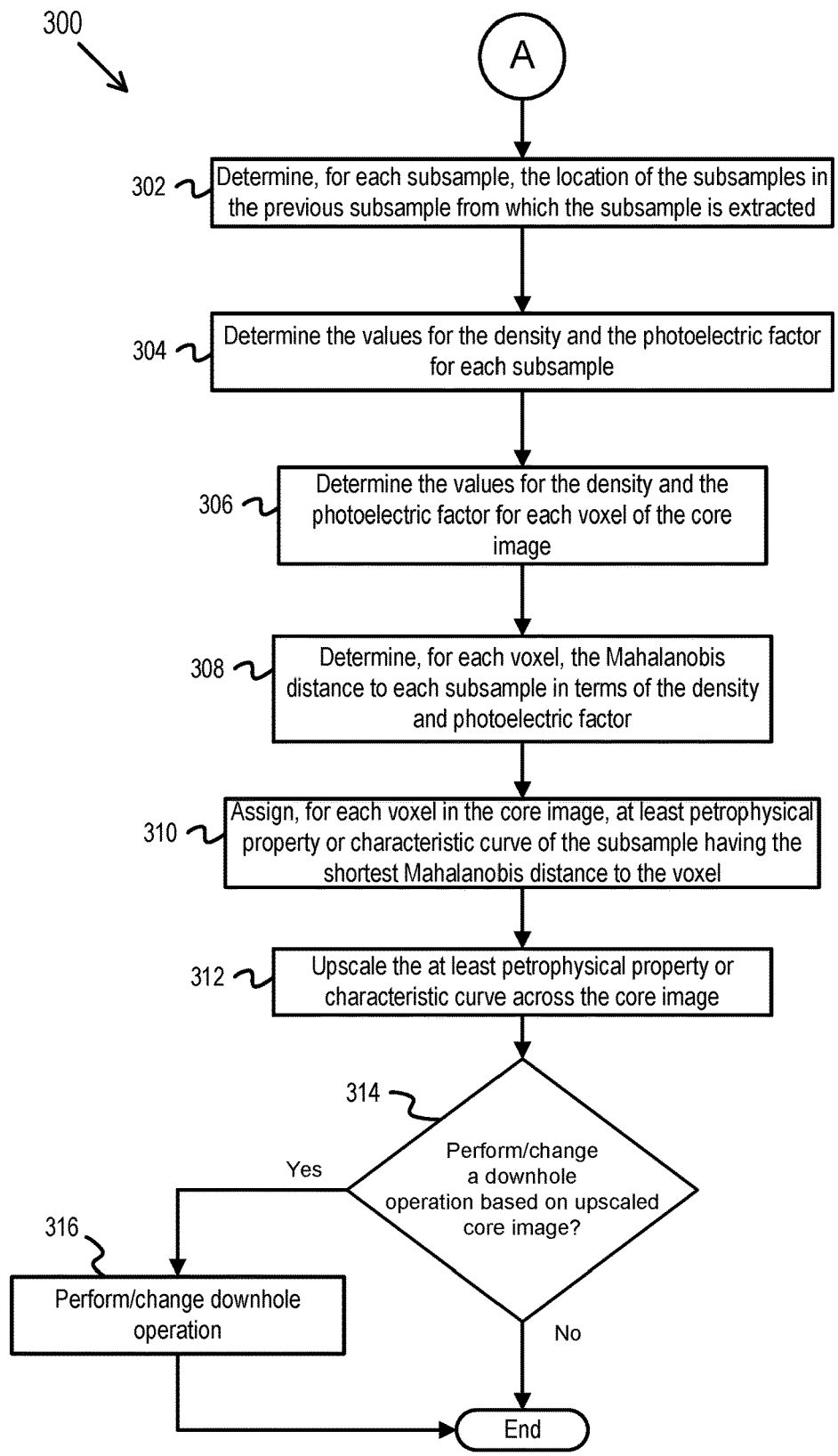

FIGS. 2-3 depict a flowchart of example operations for upscaling of formation property characteristics to a whole core scale, according to some embodiments. FIGS. 2-3 depict a flowchart 200 and a flowchart 300, respectively, having operations that include a transition point A for operations to move between the flowchart 200 and the flowchart 300. Operations of the flowcharts 200-300 can be performed by software, firmware, hardware or a combination thereof. Such operations are described with reference to the example environment of FIG. 1. However, such operations can be performed by other systems or components. For example, at least some of the operations of the flowcharts 200-300 are described as being performed by a computer at a surface of the wellbore. For instance, after the core is retrieved from downhole, the additional operations can be performed in a laboratory remote from the wellsite. The operations of the flowchart 200 start at block 202.

At block 202, a core is extracted from a subsurface formation. For example, with reference to FIG. 1, the hollowed drill bit 165 can extract a core from the subsurface formation. The size of the core can vary depending on the subsurface formation, what properties or features are being analyzed, etc. For instance, the hollowed drill bit 165 can extract cores from the subsurface formation with the size, which can be three to 60 feet in length having a four inch diameter, or a three inch diameter, etc.

At block 204, a core image is created, at a core resolution, of a core of a subsurface formation to create at a core image at two X-ray energy levels to create a density volume and a photoelectric factor volume for the core. For example, with reference to FIG. 1, a scanner coupled to the processor 160 (either local or remote to the wellsite) can create the core image of the extracted core. Different imaging technologies can be used to scan to create the core image. In some implementations, the scanner can use computed X-ray tomography (CT) to create a CT core image. For instance, the scanner can scan at two energy levels to create a whole core dual energy (DE) CT image. The scanner can create the core image at two energy levels to create a density volume and a photoelectric factor volume for the core. For example, for CT imaging, the energy level is the x-ray energy level of the scan. In some implementations, the core resolution can be high enough to allow for different textures of the core to be identified. Each texture can represent a different or distinct flow unit of the core. The different textures can be created because of different lithology, structure of the rock, etc. In some embodiments, a distinct texture of a core can be in reference to a different structural texture (such as grain size, shape, orientation, etc.) and a different stationary texture (such as a spatial distribution or pattern of the mineral grains).

At block 206, a number of subsamples are extracted from the core, wherein each subsample corresponds with a texture of a number of textures of the core. For example, a coring bit, drill, cutting device, etc. can be used at the surface of the wellbore to extract a number of subsamples from the core. A texture of a core can be identified based on what defines a texture (as described above). This identification can be made by an image processor and/or personnel (such as a geologist). The size of the subsample can vary depending on the subsurface formation, what properties or features are being analyzed, etc. In one example, a diameter of the subsample is one inch, 1.5 inches, etc.

At block 208, a subsample image is created of each of the number of subsamples (at a resolution that is higher than the previous resolution. For example, with reference to FIGS. 1-2, a scanner coupled to the processor 160 can create the subsample image of each of the subsamples extracted from the core. In some embodiments, this can be a same or different scanner as that used to scan the core. For instance, a different scanner that is able to capture images at higher resolutions can be used to create the subsample images. In some embodiments, the subsample images can be created using two energy levels to create a density volume and a photoelectric factor volume for each subsample (similar to creation of the core image described above). In other embodiments, a single energy level can be used. Different imaging technologies can be used to scan to create the subsample images. In some implementations, the scanner can use computed tomography (CT) to create CT subsample images. For instance, the scanner can scan at two energy levels to create the CT subsample images—allowing for reconstruction of density and photoelectric images for each of the subsamples. The resolution to capture the subsample images can be at a level to identify the different textures of the core. As described above, each texture can represent a different or distinct flow unit of the core. The different textures can be created because of different lithology, structure of the rock, etc. In some embodiments, a distinct texture of a core can be in reference to a different structural texture (such as grain size, shape, orientation, etc.) and a different stationary texture (such as a spatial distribution or pattern of the mineral grains).

At block 210, a determination is made of whether a viewable image threshold has been exceeded for the smallest target feature of the subsample. For example, with reference to FIG. 1, the processor 160 can make this determination. If the viewable image threshold to capture the smallest target feature of the subsample has not been exceeded, operations of the flowchart 200 continue at block 212. Otherwise, operations of the flowchart 200 continue at block 214.

At block 210, a number of subsamples are extracted from each of the previous number of subsamples, wherein each subsample corresponds with a region in a texture of a given previous subsample that best represents the texture. The regions can be defined based on different criteria (such as texture, rock types, etc.). For example, a subsample can be extracted from a region defined in terms of texture, wherein the subsample is selected to best represent the texture. A coring bit, drill, cutting device, etc. can be used to extract a number of subsamples from each of the previous number of subsamples. A region that best represents each texture can be determined by an image processor and/or personnel (such as a geologist). For example, such a region can be determined based on characteristics that are most distinctive for this texture. Such characteristics can include a characteristic that represents a different or distinct flow, different lithology, structure of the rock, etc. In some implementations, the size of the subsample can be dependent on the smallest feature of the subsurface formation important for the formation property being analyzed. For example, the subsample can be size A when the formation property is relative permeability. However, the subsample size can be B when the formation property is capillary pressure. Operations of the flowchart 200 return to block 208 to create a subsample image of each of the number of subsamples extracted at a resolution that is higher than the previous resolution. Accordingly, the resolution can be increased for a given number of subsamples (as compared to the resolution used to capture subsample images of the previous number of subsamples).

At block 214, each of the number of subsample images (of the number of subsamples last extracted) are segmented into different phase categories. For example, with reference to FIGS. 1-2, the processor 160 can segment each of the number subsample images into different phase categories. The phases can be defined in terms of types of pores and/or types of material. Examples of the different phase categories into which to segment can include resolved pores, porous rocks with unresolved pores, solid rock, etc.

At block 216, at least one petrophysical property or characteristic curve is determined for each subsample. For example, with reference to FIG. 1, the processor 160 can make these determinations. In some embodiments, these formation property characteristics can be computed or determined using different numerical simulations. In some implementations, the segmenting of a subsample image into different phase categories (from the operations at block 214) can be part of the input into these numerical simulations. Other inputs into these simulations can include fluid and flow properties, contact angles, pressures, etc. Examples characteristics curves can include a porosity-permeability relationship curve, drainage and imbibition relative permeabilities curve, drainage and imbibition capillary pressure curves, etc. For instance, Lattice-Boltzmann simulators may be used to simulate multi-phase (e.g., two-phase) flow and to compute the relative permeability and capillary pressure curves. Porosity-permeability relationships may be computed by selecting several sub-cubes for each subsample, averaging the pore space volume and computing permeability for each sub-cube. However, example embodiments can use other types of methodologies or numerical simulations to compute the value of a formation property and/or characteristics curves defining at least one formation property.

Operations of the flowchart 200 continue at transition point A, which continue at transition point A of the flowchart 300. From transition point A of the flowchart 300, operations continue at block 302.

At block 302, for each of the last extracted subsamples, their location in the previous subsample or core from which they are extracted is determined. For example, with reference to FIG. 1, the processor 160 can determine these locations.

At block 304, the values for the density and the photoelectric factor for each subsample are determined. For example, with reference to FIG. 1, the processor 160 can make these determinations (calculations). In some embodiments, these values can be the average values for the density and the photoelectric factor across the subsample.

At block 306, the values for the density and the photoelectric factor for each voxel of the core image are determined. For example, with reference to FIG. 1, the processor 160 can make these determinations (calculations).

At block 308, for each voxel in the core image, the Mahalanobis distance to each subsample is determined in terms of the density and photoelectric factor. For example, with reference to FIG. 1, the processor 160 can make these determinations. While described in reference to using the Mahalanobis distance, example embodiments can use other distance comparisons in terms of the density and the photoelectric factor.

At block 310, for each voxel in the core image, at least one petrophysical property or characteristic curve of the subsample having the shortest Mahalanobis distance to the voxel is assigned. For example, with reference to FIG. 1, the processor 160 can perform this operation. For instance, each voxel in the core image can be populated with one porosity, one permeability, one set relative permeability curves and one capillary pressure curve.

At block 312, the at least one petrophysical property or characteristic curve is upscaled across the core image. For example, with reference to FIG. 1, the processor 160 can perform this operation. In some embodiments, this upscaling can be performed using a multi-phase (e.g., two-phase) flow simulation. For example, a two-phase flow simulation at the Darcy scale can be used to perform the upscaling. For instance, oil and water can be injected at constant flow rates, until steady-state is reached. The effective relative permeability to each phase can be computed by inverting Darcy equation using the concept of phase mobility. Such example operations can be repeated for different fractional flows while maintaining the total injected flow rate constant. Accordingly, the final petrophysical property or characteristic curve can be computed at a larger scale (larger than the subsample scale, where these simulations are typically carried out) and can include the effects of rock heterogeneity that is seen only at this larger scale. Therefore, such embodiments can include results that can be of special relevance in carbonate cores where a multi-modal pore size distribution is seen and diagenetic alteration is more pronounced.

At block 314, a determination is made of whether to perform or change a downhole operation based on the upscaled core image. For example, with reference to FIG. 1, during a drilling operation, the processor 160 can make this determination based on the upscaled core image. For instance, the computer can alter a geosteering parameter, a weight on bit, rate of penetration, etc. If a downhole operation is to be performed or change, operations of the flowchart 300 continue at block 316. Otherwise, operations of the flowchart 300 are complete.

At block 316, a downhole operation is performed or changed. For example, with reference to FIG. 1, the drilling system 100 can change a parameter of the geosteering to update a direction of the drilling of the wellbore based on the upscaled core image. Operations of the flowchart 300 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a computer or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 4:
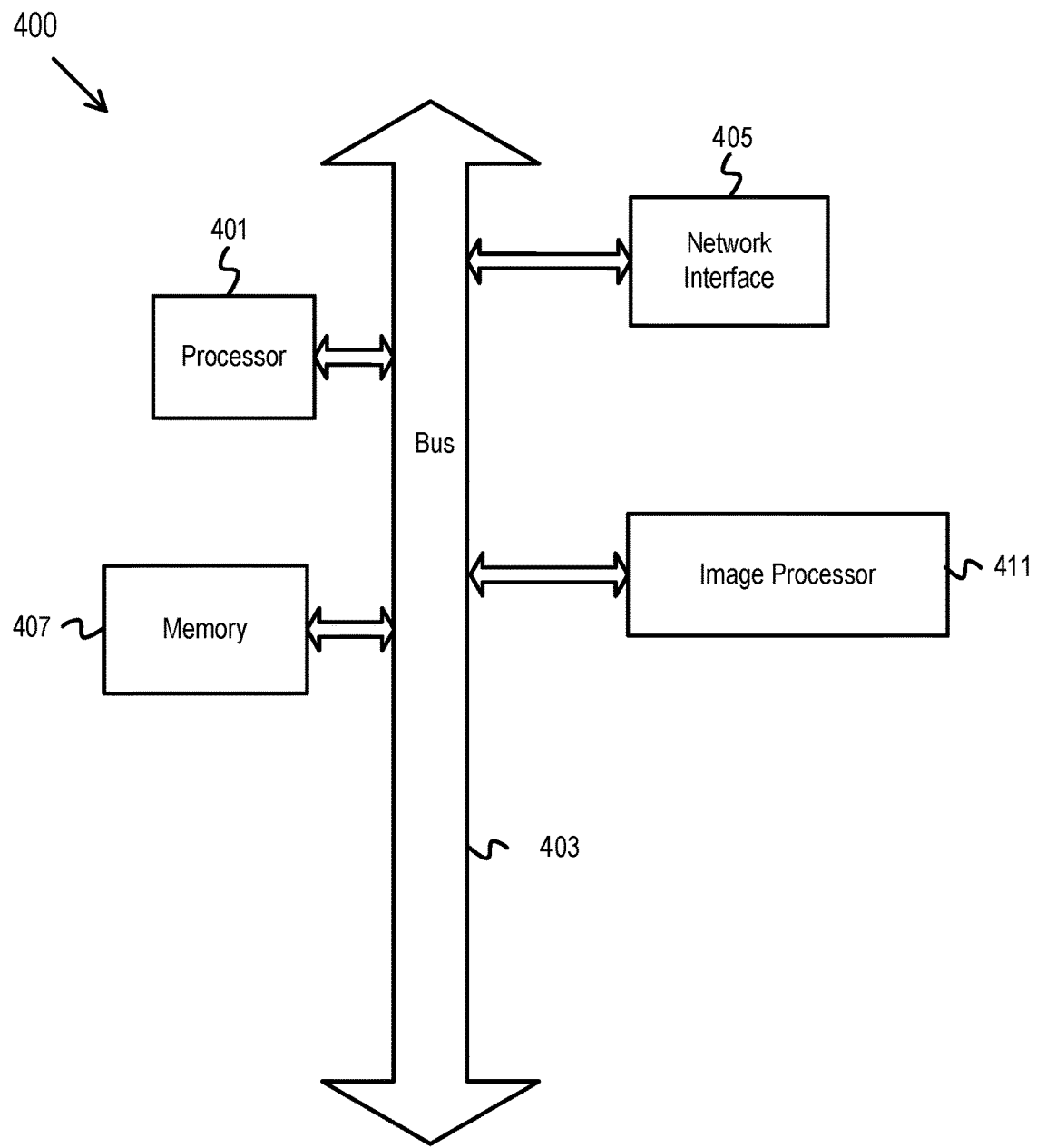
FIG. 4 depicts an example computer, according to some embodiments.

FIG. 4 depicts an example computer, according to some embodiments. A computer 400 system includes a processor 401 (possibly including multiple processors, multiple cores, multiple nodes, and/or implementing multi-threading, etc.). The computer 400 includes a memory 407. The memory 407 may be system memory or any one or more of the above already described possible realizations of machine-readable media. The computer 400 also includes a bus 403 and a network interface 405. The computer 400 can communicate via transmissions to and/or from remote devices via the network interface 405 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 400 also includes an image processor 411 that can perform at least some of the operations described herein. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for cement bonding condition evaluation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment #1: A method comprising: imaging, at an imaging resolution, a core of a subsurface formation to create a core image at at least one energy level; iteratively performing the following operations until a defined feature of a rock of the subsurface formation exceeds a viewable image feature threshold in the number of subsample images, extracting a number of subsamples from the core for a first iteration and from each of the number of subsamples previously extracted for a subsequent iteration; increasing the imaging resolution; imaging each subsample of the number of subsamples, at the imaging resolution, to create a number of subsample images for each of the number of subsamples at the at least one energy level; performing the following operations for the number of subsamples last extracted, determining, for each of the number of subsamples, at least one formation property characteristic that comprises at least one of a value of at least one formation property and a characteristic curve defining the at least one formation property; determining a guiding rock property of a number of guiding rock properties for each voxel of a number of voxels of the core image and the number of subsample images; and determining, for each voxel of the number of voxels of the core image in a guiding rock property space, a subsample that is a shortest distance to the voxel based on the number of guiding rock properties; and mapping, for each of the number of voxels of the core image, the at least one formation property characteristic of the subsample that is the shortest distance to the voxel.

Embodiment #2: The method of Embodiment #1, further comprising: upscaling the at least one formation property characteristic for the core image.

Embodiment #3: The method of Embodiment #2, wherein upscaling the at least one formation property characteristic for the core image comprises performing a multi-phase simulation.

Embodiment #4: The method of any one of Embodiments #1-3, wherein the at least one formation property characteristic comprises at least one of a porosity, a permeability, a relative permeability curve, and a capillary pressure curve.

Embodiment #5: The method of any one of Embodiments #1-4, wherein determining, for each of the number of voxels of the core image, the subsample that is the shortest distance to the voxel comprises: determining a density and a photoelectric factor for each voxel; determining a density and a photoelectric factor for each subsample; and determining the subsample that is the shortest distance to the voxel based on the subsample having the density and the photoelectric factor that is closest to the density and the photoelectric factor of the voxel.

Embodiment #6: The method of Embodiment #5, wherein determining the subsample that is the shortest distance to the voxel comprises determining the subsample having a shortest Mahalanobis distance to the voxel.

Embodiment #7: The method of any one of Embodiments #1-6, wherein each of the number of subsamples correspond with a different texture from the core or the subsample from which each is extracted.

Embodiment #8: The method of any one of Embodiments #1-7, wherein imaging the core comprises: imaging the core at a first energy level of the at least one energy level to create a density volume of the core; and imaging the core at a second energy level of the at least one energy level to create a photoelectric factor volume of the core.

Embodiment #9: A system comprising: a coring bit to be positioned in a wellbore formed in a subsurface formation, the coring bit to extract a core from the subsurface formation, wherein a number of samples are to be extracted from the core; at least one scanner; a processor; and a machine-readable medium having program code executable by the processor to cause the processor to, image, at an imaging resolution using the at least one scanner, the core to create a core image at at least one energy level; extract a number of subsamples from the core; increase the imaging resolution; image, using the at least one scanner, each subsample of the number of subsamples at the imaging resolution to create a number of subsample images at the at least one energy level; iteratively perform the following operations until a defined feature of a rock of the subsurface formation exceeds a viewable image feature threshold in the number of subsample images, extract a number of subsamples from each of the number of subsamples previously extracted; increase the imaging resolution; image, using the at least one scanner, each subsample of the number of subsamples, at the imaging resolution, to create a number of subsample images for each of the number of sub samples at the at least one energy level; perform the following operations for the number of subsamples last extracted, determine, for each of the number of subsamples, at least one formation property characteristic that comprises at least one of a value of at least one formation property and a characteristic curve defining the at least one formation property; determine a guiding rock property of a number of guiding rock properties for each voxel of a number of voxels of the core image and the number of subsample images; and determine, for each voxel of the number of voxels of the core image in a guiding rock property space, a subsample that is a shortest distance to the voxel based on the number of guiding rock properties; and map, for each of the number of voxels of the core image, the at least one formation property characteristic of the subsample that is the shortest distance to the voxel.

Embodiment #10: The system of Embodiment #9, wherein the program code comprises program code executable by the processor to cause the processor to upscale the at least one formation property characteristic for the core image.

Embodiment #11: The system of Embodiment #10, wherein the program code executable by the processor to cause the processor to upscale the at least one formation property characteristic for the core image comprises program code executable by the processor to cause the processor to perform a multi-phase simulation.

Embodiment #12: The system of any one of Embodiments #9-11, wherein the at least one formation property characteristic comprises at least one of a porosity, a permeability, a relative permeability curve, and a capillary pressure curve.

Embodiment #13: The system of any one of Embodiments #9-12, wherein the program code executable by the processor to cause the processor to determine, for each of the number of voxels of the core image, the subsample that is the shortest distance to the voxel comprises program code executable by the processor to cause the processor to, determine a density and a photoelectric factor for each voxel; determine a density and a photoelectric factor for each subsample; and determine the subsample that is the shortest distance to the voxel based on the subsample having the density and the photoelectric factor that is closest to the density and the photoelectric factor of the voxel.

Embodiment #14: The system of Embodiment #13, wherein the program code executable by the processor to cause the processor to determine the subsample that is the shortest distance to the voxel comprises program code executable by the processor to cause the processor to determine the subsample having a shortest Mahalanobis distance to the voxel.

Embodiment #15: The system of Embodiment #13, wherein the program code executable by the processor to cause the processor to image the core comprises program code executable by the processor to cause the processor to, image the core at a first energy level of the at least one energy level to create a density volume of the core; and image the core at a second energy level of the at least one energy level to create a photoelectric factor volume of the core.

Embodiment #16: The system of any one of Embodiments #9-15, wherein each of the number of subsamples correspond with a different texture from the core or the subsample from which each is extracted.

Embodiment #17: One or more non-transitory machine-readable media comprising program code executable by a processor to cause the processor to: image, at an imaging resolution, a core of a subsurface formation to create a core image at at least one energy level; iteratively perform the following operations until a defined feature of a rock of the subsurface formation exceeds a viewable image feature threshold in the number of subsample images, extract a number of subsamples from the core for a first iteration and from each of the number of subsamples previously extracted for a subsequent iteration; increase the imaging resolution; image each subsample of the number of subsamples, at the imaging resolution, to create a number of subsample images for each of the number of subsamples at the at least one energy level; perform the following operations for the number of subsamples last extracted, determine, for each of the number of subsamples, at least one formation property characteristic that comprises at least one of a value of at least one formation property and a characteristic curve defining the at least one formation property; determine a guiding rock property of a number of guiding rock properties for each voxel of a number of voxels of the core image and the number of subsample images; and determine, for each voxel of the number of voxels of the core image in a guiding rock property space, a subsample that is a shortest distance to the voxel based on the number of guiding rock properties; and map, for each of the number of voxels of the core image, the at least one formation property characteristic of the subsample that is the shortest distance to the voxel.

Embodiment #18: The one or more non-transitory machine-readable media of Embodiment #17, wherein the program code comprises program code executable by the processor to cause the processor to upscale the at least one formation property characteristic for the core image.

Embodiment #19: The one or more non-transitory machine-readable media of any one of Embodiments #17-18, wherein the at least one formation property characteristic comprises at least one of a porosity, a permeability, a relative permeability curve, and a capillary pressure curve.

Embodiment #20: The one or more non-transitory machine-readable media of any one of Embodiments #17-19, wherein the program code executable by the processor to cause the processor to determine, for each of the number of voxels of the core image, the subsample that is the shortest distance to the voxel comprises program code executable by the processor to cause the processor to: determine a density and a photoelectric factor for each voxel; determine a density and a photoelectric factor for each subsample; and determine the subsample that is the shortest distance to the voxel based on the subsample having the density and the photoelectric factor that is closest to the density and the photoelectric factor of the voxel.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    imaging, at an imaging resolution, a core of a subsurface formation to create a core image at at least one energy level;
    iteratively performing the following operations until a defined feature of a rock of the subsurface formation exceeds a viewable image feature threshold in a number of subsample images,
        extracting a number of subsamples from the core for a first iteration and from each of the number of subsamples previously extracted for a subsequent iteration;
        increasing the imaging resolution;
        imaging each subsample of the number of subsamples, at the imaging resolution, to create a number of subsample images for each of the number of subsamples at the at least one energy level;
    performing the following operations for the number of subsamples last extracted,
        determining, for each of the number of subsamples, at least one formation property characteristic that comprises at least one of a value of at least one formation property and a characteristic curve defining the at least one formation property;

determining a guiding rock property of a number of guiding rock properties for each voxel of a number of voxels of the core image and the number of subsample images; and determining, for each voxel of the number of voxels of the core image in a guiding rock property space, a subsample that is a shortest distance to the voxel based on the number of guiding rock properties; and mapping, for each of the number of voxels of the core image, the at least one formation property characteristic of the subsample that is the shortest distance to the voxel.

2. The method of claim 1, further comprising:
upscaling the at least one formation property characteristic for the core image.

3. The method of claim 2, wherein upscaling the at least one formation property characteristic for the core image comprises performing a multi-phase simulation.

4. The method of claim 1, wherein the at least one formation property characteristic comprises at least one of a porosity, a permeability, a relative permeability curve, and a capillary pressure curve.

5. The method of claim 1, wherein determining, for each of the number of voxels of the core image, the subsample that is the shortest distance to the voxel comprises:
determining a density and a photoelectric factor for each voxel;
determining a density and a photoelectric factor for each subsample; and
determining the subsample that is the shortest distance to the voxel based on the subsample having the density and the photoelectric factor that is closest to the density and the photoelectric factor of the voxel.

6. The method of claim 5, wherein determining the subsample that is the shortest distance to the voxel comprises determining the subsample having a shortest Mahalanobis distance to the voxel.

7. The method of claim 1, wherein each of the number of subsamples correspond with a different texture from the core or the subsample from which each is extracted.

8. The method of claim 1, wherein imaging the core comprises:
imaging the core at a first energy level of the at least one energy level to create a density volume of the core; and
imaging the core at a second energy level of the at least one energy level to create a photoelectric factor volume of the core.

9. A system comprising:
a coring bit to be positioned in a wellbore formed in a subsurface formation, the coring bit to extract a core from the subsurface formation, wherein a number of samples are to be extracted from the core;
at least one scanner;
a processor; and
a machine-readable medium having program code executable by the processor to cause the processor to,
image, at an imaging resolution using the at least one scanner, the core to create a core image at at least one energy level;
extract a number of subsamples from the core;
increase the imaging resolution;
image, using the at least one scanner, each subsample of the number of subsamples at the imaging resolution to create a number of subsample images at the at least one energy level;
iteratively perform the following operations until a defined feature of a rock of the subsurface formation exceeds a viewable image feature threshold in the number of subsample images,
extract a number of subsamples from each of the number of subsamples previously extracted;
increase the imaging resolution;
image, using the at least one scanner, each subsample of the number of subsamples, at the imaging resolution, to create a number of subsample images for each of the number of subsamples at the at least one energy level;
perform the following operations for the number of subsamples last extracted,
determine, for each of the number of subsamples, at least one formation property characteristic that comprises at least one of a value of at least one formation property and a characteristic curve defining the at least one formation property;
determine a guiding rock property of a number of guiding rock properties for each voxel of a number of voxels of the core image and the number of subsample images; and
determine, for each voxel of the number of voxels of the core image in a guiding rock property space, a subsample that is a shortest distance to the voxel based on the number of guiding rock properties; and
map, for each of the number of voxels of the core image, the at least one formation property characteristic of the subsample that is the shortest distance to the voxel.

10. The system of claim 9, wherein the program code comprises program code executable by the processor to cause the processor to upscale the at least one formation property characteristic for the core image.

11. The system of claim 10, wherein the program code executable by the processor to cause the processor to upscale the at least one formation property characteristic for the core image comprises program code executable by the processor to cause the processor to perform a multi-phase simulation.

12. The system of claim 9, wherein the at least one formation property characteristic comprises at least one of a porosity, a permeability, a relative permeability curve, and a capillary pressure curve.

13. The system of claim 9, wherein the program code executable by the processor to cause the processor to determine, for each of the number of voxels of the core image, the subsample that is the shortest distance to the voxel comprises program code executable by the processor to cause the processor to,
determine a density and a photoelectric factor for each voxel;
determine a density and a photoelectric factor for each subsample; and
determine the subsample that is the shortest distance to the voxel based on the subsample having the density and the photoelectric factor that is closest to the density and the photoelectric factor of the voxel.

14. The system of claim 13, wherein the program code executable by the processor to cause the processor to determine the subsample that is the shortest distance to the voxel comprises program code executable by the processor to cause the processor to determine the subsample having a shortest Mahalanobis distance to the voxel.

15. The system of claim 13, wherein the program code executable by the processor to cause the processor to image the core comprises program code executable by the processor to cause the processor to, image the core at a first energy level of the at least one energy level to create a density volume of the core; and image the core at a second energy level of the at least one energy level to create a photoelectric factor volume of the core.

16. The system of claim 9, wherein each of the number of subsamples correspond with a different texture from the core or the subsample from which each is extracted.

17. One or more non-transitory machine-readable media comprising program code executable by a processor to cause the processor to:

image, at an imaging resolution, a core of a subsurface formation to create a core image at at least one energy level;

iteratively perform the following operations until a defined feature of a rock of the subsurface formation exceeds a viewable image feature threshold in a number of subsample images, extract a number of subsamples from the core for a first iteration and from each of the number of subsamples previously extracted for a subsequent iteration;

increase the imaging resolution;

image each subsample of the number of subsamples, at the imaging resolution, to create a number of subsample images for each of the number of subsamples at the at least one energy level;

perform the following operations for the number of subsamples last extracted, determine, for each of the number of subsamples, at least one formation property characteristic that comprises at least one of a value of at least one formation property and a characteristic curve defining the at least one formation property;

determine a guiding rock property of a number of guiding rock properties for each voxel of a number of voxels of the core image and the number of subsample images; and determine, for each voxel of the number of voxels of the core image in a guiding rock property space, a subsample that is a shortest distance to the voxel based on the number of guiding rock properties; and map, for each of the number of voxels of the core image, the at least one formation property characteristic of the subsample that is the shortest distance to the voxel.

18. The one or more non-transitory machine-readable media of claim 17, wherein the program code comprises program code executable by the processor to cause the processor to upscale the at least one formation property characteristic for the core image.

19. The one or more non-transitory machine-readable media of claim 17, wherein the at least one formation property characteristic comprises at least one of a porosity, a permeability, a relative permeability curve, and a capillary pressure curve.

20. The one or more non-transitory machine-readable media of claim 17, wherein the program code executable by the processor to cause the processor to determine, for each of the number of voxels of the core image, the subsample that is the shortest distance to the voxel comprises program code executable by the processor to cause the processor to:

determine a density and a photoelectric factor for each voxel;

determine a density and a photoelectric factor for each subsample; and determine the subsample that is the shortest distance to the voxel based on the subsample having the density and the photoelectric factor that is closest to the density and the photoelectric factor of the voxel.

* * * * *